(12) United States Patent
Zhang (10) Patent No.: US 10,567,985 B2
(45) Date of Patent: Feb. 18, 2020

(54) RELAY NODE RELATED MEASUREMENTS

(75) Inventor: Shunliang Zhang, Beijing (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 241 days.

(21) Appl. No.: 13/978,287

(22) PCT Filed: Jan. 10, 2011

(86) PCT No.: PCT/CN2011/000039
§ 371 (c)(1),
(2), (4) Date: Jul. 3, 2013

(87) PCT Pub. No.: WO2012/094774
PCT Pub. Date: Jul. 19, 2012

(65) Prior Publication Data
US 2013/0279346 A1 Oct. 24, 2013

(51) Int. Cl.
*H04W 24/08* (2009.01)
(52) U.S. Cl.
CPC .................................. *H04W 24/08* (2013.01)
(58) Field of Classification Search
CPC ............... H04W 24/08; H04L 43/0852; H04L 43/0829; H04B 7/15542; H04B 17/40
See application file for complete search history.

(56) References Cited

U.S. PATENT DOCUMENTS

| 2007/0223378 A1 | 9/2007 | Take et al. |
| 2009/0181693 A1 | 7/2009 | So et al. |
| 2009/0252065 A1* | 10/2009 | Zhang ............... H04L 41/082 370/256 |
| 2010/0246476 A1* | 9/2010 | Hethuin ............... H04W 16/28 370/315 |
| 2011/0090808 A1* | 4/2011 | Chen .................. H04B 7/15542 370/252 |
| 2011/0230187 A1* | 9/2011 | Jeon ...................... H04B 7/2606 455/434 |
| 2011/0249642 A1* | 10/2011 | Song .................... H04W 28/16 370/329 |
| 2012/0069793 A1 | 3/2012 | Chung et al. |
| 2012/0127915 A1* | 5/2012 | Moberg ................ H04B 7/155 370/315 |

(Continued)

FOREIGN PATENT DOCUMENTS

CN 1897758 A 1/2007
CN 101388707 A 3/2009
(Continued)

OTHER PUBLICATIONS

Notification of Reasons for Rejection dated Jun. 22, 2015 corresponding to Japanese Patent Application No. 2013-548715.
(Continued)

*Primary Examiner* — Will W Lin
(74) *Attorney, Agent, or Firm* — Squire Patton Boggs (US) LLP (57) ABSTRACT

A method for relay node related measurements is provided. The method includes the following steps: obtaining air interface related measurements; and forming form the measurements at least one merely relay node related measurement result. The method can facilitate use of relay nodes and guarantee the advantages provided by the relay nodes.

13 Claims, 3 Drawing Sheets

(56) References Cited

U.S. PATENT DOCUMENTS

| | | | | |
|---|---|---|---|---|
| 2012/0140652 A1* | 6/2012 | Pan | ............... | H04B 7/15592 370/252 |
| 2012/0170504 A1* | 7/2012 | Hoymann | ............ | H04B 7/155 370/312 |
| 2012/0195226 A1* | 8/2012 | Liu | ............ | H04L 1/0026 370/252 |
| 2012/0314569 A1* | 12/2012 | Liu | ............ | H04W 36/0094 370/230 |
| 2013/0064169 A1* | 3/2013 | Song | ............ | H04B 7/155 370/315 |
| 2015/0223093 A1* | 8/2015 | Zhang | ............ | H04W 24/10 370/252 |

FOREIGN PATENT DOCUMENTS

| | | |
|---|---|---|
| CN | 101742573 A | 6/2010 |
| CN | 101867985 A | 10/2010 |
| CN | 101877856 A | 11/2010 |
| CN | 102404770 A | 4/2012 |
| EP | 2 398 160 A2 | 12/2011 |
| JP | 2007-259092 A | 10/2007 |
| JP | 2008-532350 A | 8/2008 |
| JP | 2012-525068 A | 10/2012 |
| JP | 2012-527163 A | 11/2012 |
| JP | 2014-500662 A | 1/2014 |
| KR | 20060132422 A | 12/2006 |
| WO | WO 2006/083565 A2 | 8/2006 |
| WO | 2010/031436 A1 | 3/2010 |
| WO | 2010/057521 A1 | 5/2010 |
| WO | 2010/086023 A1 | 8/2010 |
| WO | 2010/093183 A2 | 8/2010 |
| WO | 2010/137926 A2 | 12/2010 |

OTHER PUBLICATIONS

International Search Report and Written Opinion dated Oct. 20, 2011 corresponding to International Patent Application No. PCT/CN2011/000039.
Chinese Patent Office, Office Action for application No. 201180064667.2, dated Sep. 20, 2016.
Nokia et al: "Considerations on TDD Relay"; R1-090734; 3GPP TSG RAN WG1 Meeting #56, Athens, Greece, Feb. 9-13, 2009; pp. 1-4; 3rd Generation Partnership Project (3GPP); Mobile Competence Centre; 650, Route des Lucioles; F-06921 Sophia-Antipolis Cedex; France.
Qualcomm Europe: "Preference for Relay Operation in LTE-A"; R1-090876; 3GPP TSG-RAN WG1 #56, Feb. 9-13, 2009, Athens, Greece; pp. 1-8; 3rd Generation Partnership Project (3GPP); Mobile Competence Centre; 650, Route des Lucioles; F-06921 Sophia-Antipolis Cedex; France.
3GPP TS 36.314 V10.0.0 (Dec. 2010) "3rd Generation Partnership Project; Technical Specification Group Radio Access Network; Evolved Universal Terrestrial Radio Access (E-UTRA); Layer 2—Measurements (Release 10)"; pp. 1-17; 3rd Generation Partnership Project (3GPP); Mobile Competence Centre; 650, Route des Lucioles; F-06921 Sophia-Antipolis Cedex; France.
3GPP TS 36.314 V9.1.0 (Jun. 2010) "3rd Generation Partnership Project; Technical Specification Group Radio Access Network; Evolved Universal Terrestrial Radio Access (E-UTRA); Layer 2—Measurements (Release 9)"; pp. 1-17; 3rd Generation Partnership Project (3GPP); Mobile Competence Centre; 650, Route des Lucioles; F-06921 Sophia-Antipolis Cedex; France.
Catt: "L2 measurements of RN"; R2-106318; 3GPP TSG RAN WG2 Meeting #72, Jacksonville, US, Nov. 15-19, 2010; pp. 1-3; 3rd Generation Partnership Project (3GPP); Mobile Competence Centre; 650, Route des Lucioles; F-06921 Sophia-Antipolis Cedex; France.
Ericsson et al: "L2 measurements in DeNB and RN"; Tdoc R2-106472; 3GPP TSG-RAN WG2 #72, Jacksonville, USA, Nov. 15-19, 2010; pp. 1-5; 3rd Generation Partnership Project (3GPP); Mobile Competence Centre; 650, Route des Lucioles; F-06921 Sophia-Antipolis Cedex; France.
NTT Docomo Inc.: "DeNB cell measurements during RN attach"; R3-103443 (Resubmission of R3-102840); 3GPP TSG-RAN WG3 #70; Nov. 15-19, 2010, Jacksonville (FL), USA; pp. 1-3; 3rd Generation Partnership Project (3GPP); Mobile Competence Centre; 650, Route des Lucioles; F-06921 Sophia-Antipolis Cedex; France.
European Search Report application No. 11855879.0 dated Aug. 14, 2014.
Japanese Notice of Reasons for Rejection application No. 2013-548715 notification date Jul. 23, 2014.
Korean Notice to File a Response application No. 10-2013-7020254 dated Jul. 29, 2014.
Chinese Patent Office, Office Action corresponding to Patent Appln. No. 201180064667.2, dated Jul. 19, 2017.
Chinese Patent Office, Office Action corresponding to Appln. No. 201180064667.2, dated Oct. 30, 2017.
3GPP TS 36.423 V10.0.0 (Dec. 2010) "3rd Generation Partnership Project; Technical Specification Group Radio Access Network; Evolved Universal Terrestrial Radio Access Network (E-UTRAN); X2 application protocol (X2AP) (Release 10)", pp. 1-123.
3GPP TS 36.331 V9.5.0 (Dec. 2010) "3rd Generation Partnership Project; Technical Specification Group Radio Access Network; Evolved Universal Terrestrial Radio Access Network (E-UTRA); Radio Resource Control (RRC); Protocol specification (Release 9)", pp. 1-252.
Indian Examination Report dated Apr. 25, 2018, issued in corresponding Indian Application No. 5515/DELNP/2013.
European Office Action issued in corresponding European Patent Application No. 11 855 879.0-1216 dated Mar. 6, 2019.

* cited by examiner

RELAY NODE RELATED MEASUREMENTS

FIELD

The invention relates to the field of telecommunications.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

The evolvement of wireless cellular communications technologies and different services increase user needs to obtain over a wireless connection same broadband services that are obtained via a fixed connection. To fulfill both mobility requirements and increasing speed requirements, a solution called long term evolution (LTE), has been specified in 3GPP (Third Generation Partnership Project). LTE is a packet-only wideband radio access with flat architecture that provides higher data speeds and reduced packet latency and supports various services, such as high-speed data, multimedia unicast and multimedia broadcast services. One step in the evolution path towards fourth generation (4 G) cellular systems is a further development of LTE, called LTE-Advanced (LTE-A).

Relay nodes (RN) have been introduced to LTE-A to enhance coverage of high data rates, group mobility, temporary network deployment, a cell-edge throughput and/or to provide coverage in new areas. A relay node is an intermediate node between a donor base station (such as an enhanced node B, or advanced enhanced node B, i.e. DeNB) and a user equipment. Thus, there may be user equipments connected to the base station directly, and user equipments connected to the base station via the relay node. User equipments directly connected to the base station, so called macro user equipments, and the relay nodes are similar to the base station in many ways. For example, it has been suggested that measurements to be performed to support radio link operations, resource management, etc., should be performed in the same way regardless of whether the measurements relate to a relay node or to a macro user equipment or both of them in combination. However, characteristics relating to relay node usage may be different from those relating to serving macro user equipments.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

An aspect provides a solution in which relay node related measurements are performed and/or reported so that relay node related results may be given separately and/or taken into account separately from measurement results of macro user equipments or from measurement results comprising information from both relay nodes and macro user equipment nodes.

Various aspects of the invention comprise methods, an apparatus, a system and a computer program product as defined in the independent claims. Further embodiments of the invention are disclosed in the dependent claims.

BRIEF DESCRIPTION OF THE DRAWINGS

In the following the invention will be described in greater detail by means of preferred embodiments with reference to the attached drawings, in which.

DETAILED DESCRIPTION OF SOME EMBODIMENTS

Exemplary embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiments(s) in several locations, this does not necessarily mean that each such reference is to the same embodiment(s), or that the feature only applies to a single embodiment. Single features of different embodiments may also be combined to provide other embodiments.

Embodiments of present invention are applicable to any access device (e.g. a base station or a relay node), corresponding components, corresponding apparatuses, and/or to any communication system or any combination of different communication systems utilizing the above described basic idea of relay nodes, i.e. acting as intermediate nodes. The communication system may be a wireless communication system or a communication system utilizing both fixed networks and wireless networks. The protocols used and the specifications of communication systems, and apparatuses, especially in wireless communication, develop rapidly. Such development may require extra changes to an embodiment. Therefore, all words and expressions should be interpreted broadly and are intended to illustrate, not to restrict, the embodiment.

In the following, different embodiments will be described using, as an example of an access architecture to which the embodiments may be applied, a radio access architecture based on LTE-A, described above, without restricting the embodiments to such an architecture, however. Other examples of access architecture include WiMax, WiFi, 4 G (fourth generation) and Mobile Broadband Wireless Access (MBWA). In LTE-A, the measurements performed in a radio access network to support radio link operations, radio resource management, network operations and maintenance, and self-organizing networks (SON), are called layer 2 (L2) measurements.

Figure 1:
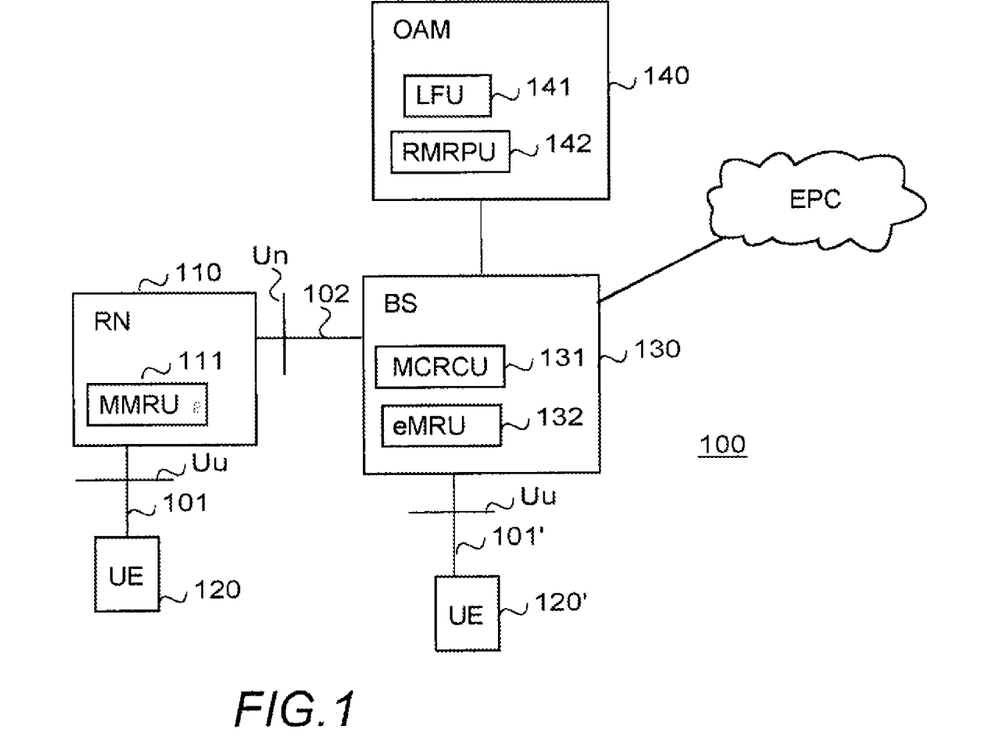
FIG. 1 shows simplified architecture of a network and a schematic diagram of apparatuses according to an embodiment.

A general architecture of LTE-A, or more precisely a radio access network 100 implementing LTE-A, is illustrated in FIG. 1. The illustrated apparatuses have some elements and functional entities that all are logical units whose implementation may differ from what is shown.

FIG. 1 is a simplified architecture only showing a relay node 110 configured to be in a wireless connection on communication channels on an access link 101 with a user equipment 120 and in a wireless connection on communication channels on a backhaul link 102 with a base station 130 providing a donor cell for the relay node. Therefore the base station is a so called donor base station for the relay node. The base station is also configured to be in a wireless connection on communication channels on an access link 101' with a user equipment 120'. The user equipment 120' is a so called macro user equipment, i.e. a user equipment served by the base station. The backhaul link comprises an interface called Un, and the access link comprises an interface called Uu. Further, the base station is connected to an evolved packet core network (EPC) and to an operations, administrations, maintenance (OAM) system 140. It is apparent to a person skilled in the art that the radio access of LTE-A comprises in practise many relay nodes and base stations serving many user equipments, a relay node may select or be assigned to a donor base station amongst multiple base stations, and one user equipment may use multiple cells, and the radio access of LTE-A may comprise other apparatuses.

The user equipments 120, 120' illustrate one type of an apparatus to which resources on the air interface are allocated and assigned. The user equipments 120, 120' refer to portable computing devices that include wireless mobile communication devices operating with or without a subscriber identification module (SIM), including, but not limited to, the following types of devices: mobile phone, smartphone, personal digital assistant (PDA), handset, laptop computer, tablet computer, e-reading device.

The operations, administrations, maintenance (OAM) system 140 may comprise of one or several nodes or OAM entities that typically, but not necessarily, are computing devices configured to provide network management functions for operation, administration, maintenance, and provisioning of networked systems but not to manage the traffic in the networked systems. The OAM system 140 may be an element management system (EMS) or network management system (NMS) in which an OAM entity manages one or more of a specific type of a network node. For example, there may be one or more separate entities for relay nodes and one or more separate entities for base stations, the entities being configured to exchange information between other entities in the OAM system and with network nodes. Depending on embodiment, the OAM system or an OAM entity may be configured to perform one or more of OAM system functionalities described below, and it may be configured to perform functionalities from different embodiments. For this purpose, the OAM system/entity may comprise a list forming unit (LFU) 141 for forming ordered donor base station lists for relay nodes, as will be described below in more detail, and/or a relay node-related measurement reports processing unit (RMRPU) 142 for receiving separate relay node related measurement results, as will be described below in more detail. The term "donor base station list" covers herein also a "donor cell list". In the illustrated embodiment, the OAM system comprises the list forming unit and the relay-related measurement reports processing unit. In another embodiment, the OAM system comprises the list forming unit, not the relay-related measurement reports processing unit. In a further embodiment, the OAM system comprises the relay-related measurement reports processing unit, not the list forming unit. In a still further embodiment, the OAM system comprises neither unit. Further, the OAM system/entity may comprise other units, and it comprises different interfaces, such as a receiving unit and a sending unit (not illustrated in FIG. 1).

The relay node, or a relay station, or an advanced relay station, or a corresponding apparatus, 110 is an intermediate node relaying communications, and not being an endpoint of a communication it relays. The relay node may be a single antenna or multi-antenna relay node. Depending on how the user equipment is aware of the relay node, it may be a transparent or non-transparent relay node. Depending on the relaying strategy, the relay node may control its own cell or be part of the donor cell. With respect to the usage of spectrum, the relay node may be an outband relay node operating or having different carrier frequencies for backhaul and access links, or an inband relay node sharing the same carrier frequencies with backhaul and access links. Further, the relay node may be a coordination relay node or a non-coordination relay node. Based on the set of features, the relay node may be a so called L1 relay that simply forwards all received signals or a so called L2 relay that will include some processing (error correction, decoding, etc.) of the received signals before retransmitting the received signals, or a so called L3 relay, i.e. a base station having a wireless backhaul and acting as a relay node. In LTE-A the L3 relay may be of type 1, 1a, 1b or type 2, wherein type 1 relay node is an inband relay node controlling cells, type 1a is an outband relay node controlling cells, type 1b is an inband relay node controlling cells with adequate antenna isolation and type 2 is an inband relay node that is part of the donor cell. Thus, the relay node 110 may be any kind of relay node. Depending on embodiment, the relay node 110 may be configured to perform one or more of relay node functionalities described below with an embodiment, and it may be configured to perform functionalities from different embodiments. For this purpose, the relay node may comprise a measuring and result reporting unit MRRU 111 for performing measurements and reporting the measurements results as will be described in detail below. Further, the relay node may comprise other units, and it comprises different interfaces, such as a receiving unit and a sending unit (not illustrated in FIG. 1).

The base station, or an evolved node B, or an advanced evolved node B, or an advanced base station, or a mobile relay base station, or a corresponding apparatus, 130 is a computing device configured to control the radio resources, and connected to the evolved packet core network, thereby providing the user equipment 110 a connection to the communication system. Herein, for the sake of clarity, term "base station" is used for this type of an apparatus/device. Typically, but not necessarily, the base station comprises all radio-related functionalities of the communication whereby the base station, for example, configures connection parameters and performs user equipment and/or relay node related measurements, like radio resource usage, packet delay and packet loss rate on the air interface between the base station and a relay node and between the base station and a directly served user equipment (i.e. over connections 101' and 102). The base station may receive measurement results from user equipments and/or from relay nodes. Depending on an embodiment, the base station 130 may be configured to perform one or more of base station functionalities described below with an embodiment, and it may be configured to perform functionalities from different embodiments. For this purpose, the base station may comprise a measurement configuration and result calculating unit (MCRCU) 131 for configuring the relay node related measurements and/or receiving measurement from relay nodes, and/or an enhanced measurement and reporting unit (eMRU) 132 for providing relay-node related separate reports, as will be described in detail below. Further, the base station may comprise other units, and it comprises different interfaces, such as a receiving unit and a sending unit (not illustrated in FIG. 1).

It should be appreciated that the OAM system/entity, the relay node, and/or the base station, or any corresponding apparatus may comprise other units used in or for information transmission or in or for measurements performed in the access network to support access network radio/air link operations, radio/air resource management, network operations and maintenance, and/or self-organizing networks, for example. However, they are irrelevant to the actual invention and, therefore, they need not to be discussed in more detail here.

Although the apparatuses, such as the OAM entity, relay node and the base station, and the units have been depicted in FIG. 1 as one entity, they may be implemented in one or more physical or logical entities or units. The units and functions may be software and/or software-hardware and/or firmware components (recorded indelibly on a medium such as read-only-memory or embodied in hard-wired computer circuitry).

The OAM entity, relay node, base station, and corresponding apparatuses implementing functionality or some functionality according to an embodiment may generally include a processor (not shown in FIG. 1), controller, control unit, micro-controller, or the like connected to a memory and to various interfaces of the apparatus. Generally the processor is a central processing unit, but the processor may be an additional operation processor. The measuring and result reporting unit MRRU 111, and/or the measurement configuration and result calculating unit (MCRCU) 131, and/or the enhanced measurement and reporting unit (eMRU) 132, and/or the list forming unit (LFU) 141 and/or the relay-related measurement reports processing unit (RMRPU) 142 may be configured as a computer or a processor, or a microprocessor, such as a single-chip computer element, or as a chipset, including at least a memory for providing storage area used for arithmetic operation and an operation processor for executing the arithmetic operation. The measuring and result reporting unit MRRU 111, and/or the measurement configuration and result calculating unit (MCRCU) 131, and/or the enhanced measurement and reporting unit (eMRU) 132, and/or the list forming unit (LFU) 141 and/or the relay-related measurement reports processing unit (RMRPU) 142 may comprise one or more computer processors, application-specific integrated circuits (ASIC), digital signal processors (DSP), digital signal processing devices (DSPD), programmable logic devices (PLD), field-programmable gate arrays (FPGA), and/or other hardware components that have been programmed in such a way to carry out one or more functions of one or more embodiments.

The receiving units and the transmitting units each provide an interface in an apparatus, the interface including a transmitter and/or a receiver or a corresponding means for receiving and/or transmitting information, such as data, content, control information, messages and performing necessary functions so that user data, content, control information, signalling and/or messages can be received and/or transmitted. The receiving and sending units may comprise a set of antennas, the number of which is not limited to any particular number.

The apparatuses, such as the relay nodes and base stations, may generally include volatile and/or non-volatile memory and typically store content, data, or the like. For example, the memory may store computer program code such as software applications (for example, for the measuring and result reporting unit MRRU 111, and/or for the measurement configuration and result calculating unit (MCRCU) 131, and/or for the enhanced measurement and reporting unit (eMRU) 132, and/or for the list forming unit (LFU) 141 and/or for the relay-related measurement reports processing unit (RMRPU) 142 or operating systems, information, data, content, or the like for the processor to perform steps associated with operation of the apparatus in accordance with embodiments. The memory may be, for example, random access memory, a hard drive, or other fixed data memory or storage device. Further, the memory, or part of it, may be removable memory detachably connected to the apparatus.

FIGS. 2 to 6 illustrate different exemplary embodiments of measurements and/or their reporting, one or more of which, depending on an embodiment implemented, may be performed in addition to layer 2 measurements specified in 3GPP TS 36.314, v10.0.0.

Figure 2:
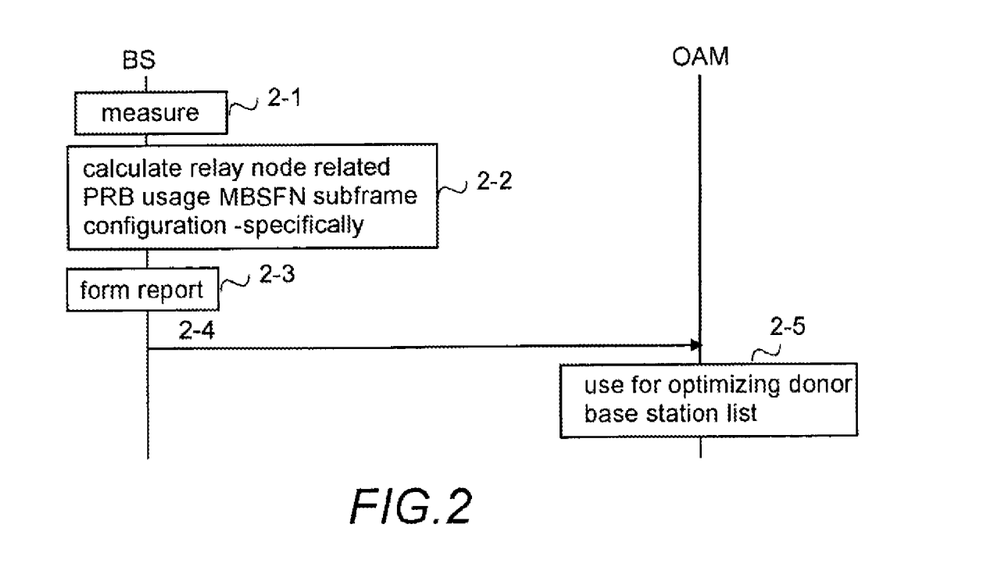
FIGS. 2 to 6 illustrate different exemplary embodiments.

FIG. 2 illustrates an embodiment in which the physical resource block (PRB) usage measurements, which are to measure usage of time and frequency resources, are enhanced to measure relay node related PRB usage per multimedia broadcast multicast service single frequency network (MBSFN) subframe configuration for relay node(s).

At least in LTE-A, for type 1 relay, a time division multiplexing (TDM)—based resource sharing within a radio frame period is applied between the relay node access link (Uu interface) and the relay node backhaul link (Un interface) so that certain subframes are reserved (configured) for the backhaul link and certain subframes for the relay node access link. Hence, each relay node can use only the certain subframes configured for the backhaul link to communicate with the donor base station, and a relay node can be scheduled only to subframes configured for the relay node backhaul link, unlike macro user equipment(s) that can use physical resource blocks also during subframes configured for the relay node.

In LTE-A, MBSFN subframe concept, and thus MBSFN subframe configuration, is used also with relay nodes, and the donor base station indicates the subframes configured for the relay node to the relay node by m-subframe configuration info. The relay node thereby knows and monitors the subframes reserved for backhaul communication, and indicates to user equipments on access link that the "m-subframe configuration" subframes are MBSFN subframes. Below m-subframe configuration is used as an example of a relay node subframe configuration without restricting embodiment to MBSFN subframe configuration solution.

When a base station is a donor base station for two or more relay nodes, the same m-subframe configuration for the relay node may be used for (shared by) the two or more relay nodes, or there are as many different m-subframe configurations for the relay nodes as there are served relay nodes, or any combination between thereof. When two or more relay nodes have the same m-subframe configurations, they use the same physical resource block(s).

Referring to an example illustrated in FIG. 2, after the base station BS has performed measurements (point 2-1), it calculates, in point 2-2, in addition to total PRB usage taking into account macro user equipments and relay nodes, relay node related PRB usage for each m-subframe configuration for one or more relay nodes permitted to use the corresponding resource (according to the m-subframe configuration in question). The relay node related PRB usage is in a similar way as the total PRB usage, i.e. in the time-frequency domain only. For an inband relay with resource portioning, the time domain means subframes configured by the donor base station for Un link communication. For an outband relay, the frequency domain means the frequency configured for Un link communication.

If only one m-subframe configuration for relay nodes is used, the calculated relay node related PRB usage may be an aggregate for all relay nodes or for all relay nodes and macro user equipments of the measured PRB usage during the measurement time, an average of the measured PRB usage during the measurement time, and/or a maximum value of the measured PRB usage during the measurement time, and/or a minimum value of the measured PRB usage during the measurement time. Typically, for inband relays, the relay node—specific PRB usage is for all relay nodes and macro user equipments, whereas for outband relays, the relay node—specific PRB usage is the measured usage on Un link(s).

If two or more different m-subframe configurations for relay nodes are used, depending on implementation, the relay node related PRB usage may be calculated as explained above to each of the m-subframe configurations, in point 2-2, to be reported as such, as is the case in the illustrated example. In another implementation, after the m-subframe configuration—specific calculations and corresponding results, an average from the m-subframe configuration—specific results are calculated, and/or a maximum and/or a minimum value is selected from the results to be reported.

In the illustrated example, the measurement results are transmitted in a measurement report to the OAM system in message 2-4. Depending on an implementation, the base station may be configured to add, in point 2-3, to the measurement report, one or more relay node related PRB usage results calculated as describe above, m-subframe configuration(s), preferably but not necessarily associated with a corresponding calculated PRB usage.

The OAM may use (point 2-5) the information for base station load balancing and/or for optimizing donor base station lists. Further, if message 2-4 contains m-subframe configuration information, it can be used in service related coordinations, such as in coordinations with a multimedia broadcast multicast service (MBMS).

It should be appreciated that in case there are more than one Un link between a relay node and a base station, the m-subframe configurations, related measurements and/or reports may be performed Un link—specifically to obtain a more detailed information.

In case each relay node (or Un link) has its own m-subframe configuration, the above calculations performed in point 2-2 results to relay node—specific PRB usage.

Thus, PRB usage per traffic class may also be calculated as a "total" PRB usage per traffic class, in which the measurement is an aggregate for all user equipments and relay nodes in a cell, and as a relay node—specific PRB usage per traffic class. The relay node—specific PRB usage may be for an inband relay an aggregate for all user equipments in a cell and relay nodes in the cell permitted to use the PRB resource according to the m-subframe configuration by the base station. For an outband relay, the relay node—specific PRB usage may be an aggregate for all relay nodes in the cell or for all relay nodes permitted to use the PRB resource.

Figure 3:
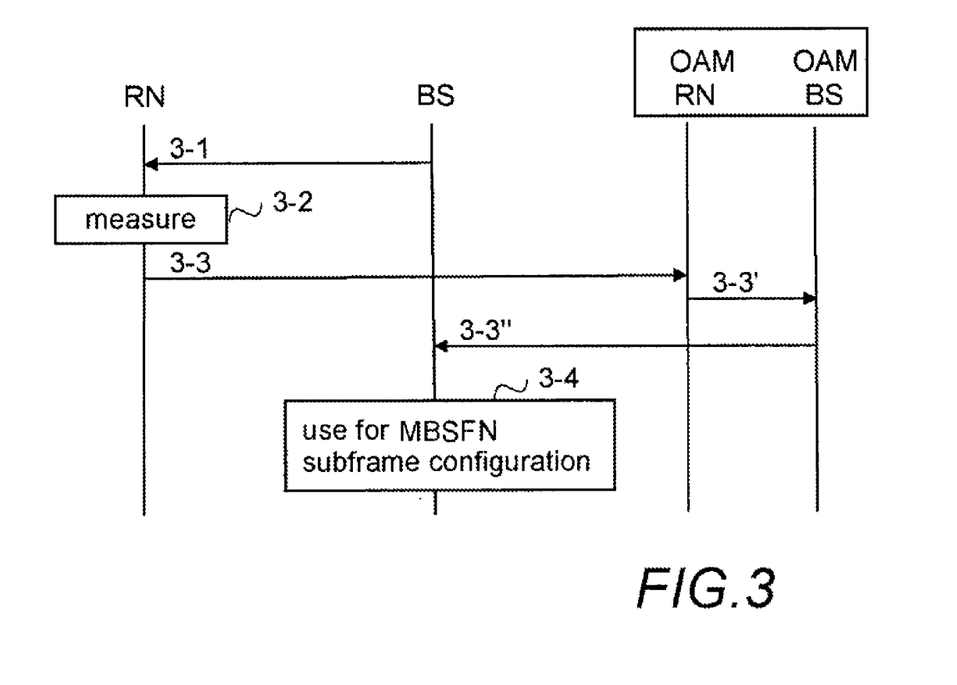
Figure 4:
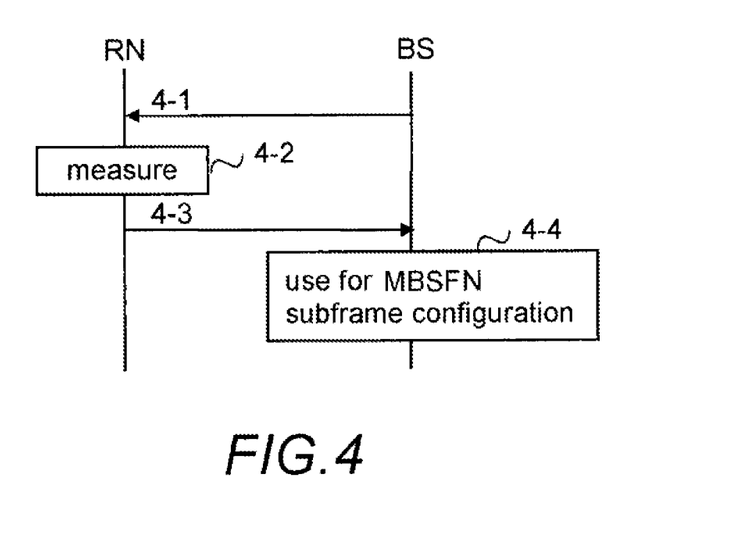

FIGS. 3 and 4 illustrate exemplary embodiments in which the base station is configured to optimize the MBSFN subframe configuration(s) the base station is using. It should be appreciated that the way MBSFN subframe configurations are obtained, is irrelevant. For example, the donor base station perform the configurations based on measurement results obtained from one or more relay nodes, the base station's own measurements and/or information obtained from the OAM system. Another example solution is that MBSFN subframe configurations are provided by the OAM system to the base station. In any case, in the examples illustrated in FIGS. 3 and 4, the donor base station is configured to optimize the MBSFN subframe configurations, and for that purpose, the base station needs measurement results from the relay node. Only if the base station receives the measurement results, it is able to take them into account.

Referring to FIG. 3, the base station BS sends message 3-1 to a relay node RN to instruct the relay node to perform and report layer 2 measurements on the relay node's Uu link. In the illustrated example, the relay node is instructed by the content in message 3-1 or originally configured to send measurement reports via OAM system, and in the illustrated example to an entity for relay nodes in the OAM system, the entity being denoted by OAM RN. Therefore, after the measurements (point 3-2), the measurement results are sent in message 3-3, to OAM RN. Depending on an implementation, the relay node may be configured to process the measurement results, such as calculate averages, etc, and then the processed results are sent in message 3-3. OAM RN detects that message 3-3 is to be forwarded, and forwards it as an internal OAM message 3-3' to en entity for the base station, denoted by OAM BS. OAM BS detects that message 3-3' is to be forwarded to the base station, and forwards it as message 3-3" to the base station.

In the illustrated example, the base station is configured to use, in point 3-4, the measurements reports on the relay node's Uu link(s) to optimize MBSFN subframe configuration(s). It should be appreciated that other information may be used for the optimization.

The exemplary embodiment illustrated in FIG. 4 differs from the one illustrated in FIG. 3 in that respect that the measurement reports are sent directly from the relay node to the base station.

Referring to FIG. 4, the base station BS sends message 4-1 to a relay node RN to instruct the relay node to perform and report layer 2 measurements on the relay node's Uu link. Therefore, after the measurements (point 4-2), the measurement results or processed measurement results are sent in message 4-3 to the base station which is configured to use, in point 4-4, the measurements reports on the relay node's Uu link(s) to optimize MBSFN subframe configuration(s). The measurement reports may be used for other radio resource management algorithms and strategy planning, as well.

In an implementation, radio resource control (RRC) layer is used to convey the measurement results, and possible instructions to measure. In the implementation, message 4-3 is an RRC message and message 4-1 may be an RRC message. In another implementation, message 4-3 is an X2 application protocol (X2AP) layer message.

In the above, message 3-1 and message 4-1 may contain specific measurement configurations to the relay node, such as content of the measurement to report, the time period to report, and a way how to report.

It should be appreciated that the base station may use the measurement reports obtained as explained above with FIGS. 3 and 4, also for other purposes.

Figure 5:
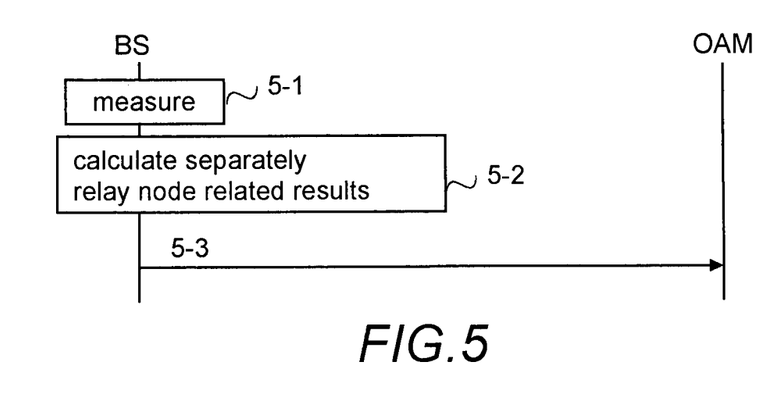

FIG. 5 illustrates an exemplary embodiment in which the base station is configured to provide one or more different relay node related measurements for OAM performance observability. In the illustrated example, the base station measures, in point 5-1, metrics/service data of relay node(s)

and user equipment(s) so that it is able to calculate, in point 5-2, also mere relay node related measurement results to be included in a report. When the report is ready, the base station sends it in message 5-3 to the OAM system.

For example, in addition to calculating the number of active UEs (which may include also relay node as is the case in prior art measurement reports since relay nodes are seen as macro user equipments in the prior art base station), the number of active relay nodes may be calculated in a similar manner as the number of active UES, and both be reported in message 5-3. Typically, the number of active UEs, and as well the number of active relay nodes, is calculated quality of service class identifier (QCI)—specifically separately for the uplink and for the downlink. When the OAM system knows more specifically the right number of relay nodes served by the base station, it has a more accurate view on the system structure, and may more easily generate a donor base station list to a new (appeared) relay node when SON is implemented, for example. Further, the number of active relay nodes may be used as part of a calculation to determine the bitrate the relay nodes achieve when they are active.

Further, or alternatively, the base station may be configured to differentiate Un link/relay nodes and Uu link/macro user equipments when reporting measurements relating to one or more of the following: packet delay in backhaul link(s), data loss (such as packet discard rate, packet loss rates etc) in backhaul link(s) and scheduled IP throughput in backhaul link(s), or some other layer 2 measurement. By having separate information on backhaul (i.e. Un) link(s), the OAM system may more easily take into account the different channel structure (different compared to the channel structure on Uu link(s)) and is able to identify possible problem(s) of the different types of links.

Figure 6:
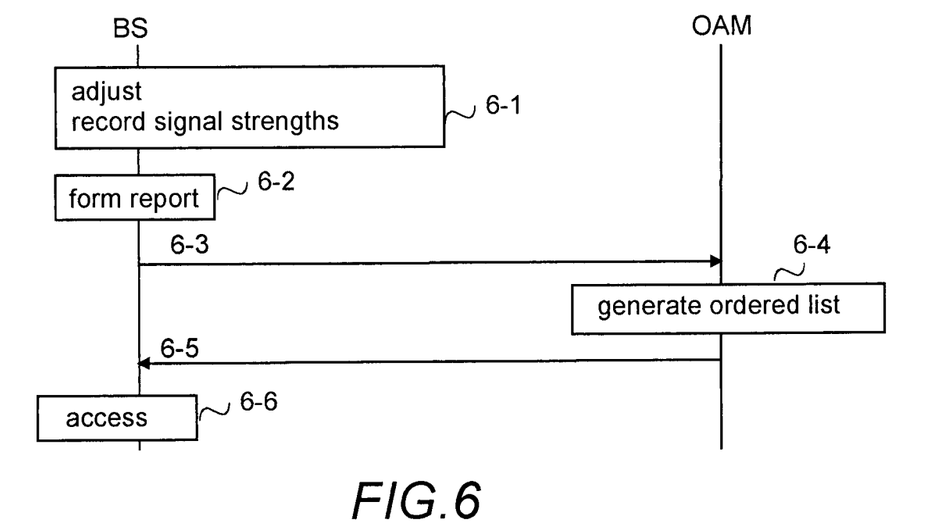

FIG. 6 illustrates an exemplary embodiment taking into account the possibility that relay nodes may have adjustable directional antennas. In the illustrated example, a relay node is configured to repeat, in point 6-1, a predetermined amount of times following functionality:

adjust directional antenna; and measure and record signal strengths from each detected cell (i.e. from each detected base station).

If the predetermined amount of times is one, then the relay node forms, in point 6-2, a measurement report containing for each base station the corresponding signal strength. If the predetermined amount of times is two or more, the relay node is in the illustrated example configured to form the measurement report so that for each base station the strongest signal strength obtained is selected. So the report may contain results obtained by different antenna adjustments.

When the report is ready, the report is sent in message 6-3 to the OAM system. The OAM system is configured to use, in point 6-4, the information in the report (and possible other information), to generate or update an ordered donor base station list for the relay node, the ordered donor base station list comprising the list of base stations whose signal strengths were measured, in an order in which the most preferred one is in the first place and the least preferred is the last in the list.

Then the list is sent in message 6-5 to the relay node, which then uses the list to select the donor base station. Preferably, the relay node is configured to try, in point 6-6, first to access the base station that is in the first place, and only if the access fails, to try to access the next base station in the list.

If the predetermined amount of times is two or more, the relay node may be configured to maintain in its memory base station—specifically the antenna adjustments that provided the strongest signal strength in point 6-1, and/or the relay node may be configured to adjust, in point 6-6, the antenna so that the selected donor base station provides the strongest signal strength, and or messages 6-3 and 6-5 contains antenna adjustments providing the strongest signal strength or information indicating the antenna adjustments, with or without the strongest signal strength.

An advantage provided by the predetermined amount of times being two or more is that with it the capabilities provided by directional adjustable antenna can be taken into account when selecting a base station providing the best donor cell, and the measurement results are more accurate. For example, having a 180° beam may indicate that a base station 2 is better but having a 90° beam may indicate that a base station 1 is better and the signal provided it with the latter beam is stronger than the signal provided by the base station 2 with the first beam. (It may even be that with the first beam the base station 1 does not even qualify to a base station candidate.)

It should be appreciated that one or more of the above described measurements/measurement report may be used for cell load balancing, especially to donor cell load balancing, to facilitate the OAM system to observe better system performance and Un link related performance in addition to Uu link related performance of a relay node (relay system), and for configuration optimization, such as optimized donor base station/cell list to a relay node. Examples of configuration optimization in systems using relay nodes include MBSFN subframe configuration for backhaul access link resource partitioning and donor base station list provision optimization.

The points and signaling messages/internal information exchange shown in FIGS. 2 to 6 are in no absolute chronological order and some of the points may be performed simultaneously or in an order different from the given one. Other functions can also be executed between the points or within the points. Some of the points or part of the points can also be left out. The signaling messages are only exemplary and may even comprise several separate messages for transmitting the same information. In addition, the messages may also contain other information. The messages and points can also be freely combined or divided into several parts. Furthermore, the names, types and/or contents of the messages may differ from the above-mentioned ones, if any is mentioned, as well as the protocols used.

Although in the above examples the layer 2 measurements were reported also as mere relay node related measurements that may not always be the case. For example, since no preambles are dedicatedly reserved for a relay node during random access, and the relay node initiates the random access channel in the same way as a macro user equipment, it is not necessary to differentiate preamble measurements.

The techniques described herein may be implemented by various means so that an apparatus implementing one or more functions described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more units/modules), or combinations thereof. For a firmware or software, implementation can be through units/modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

It will be obvious to a person skilled in the art that, as the technology advances, the inventive concept can be implemented in various ways. The invention and its embodiments are not limited to the examples described above but may vary within the scope of the claims.

The invention claimed is:

1. A method comprising:
    obtaining air interface related measurements, at a base station, wherein the air interface related measurements comprise physical resource block usage measurements to measure both a user equipment directly connected to the base station and at least one relay node related physical resource block usage;
    forming from the measurements comprising data of both the user equipment directly connected to the base station and the at least one relay node, at the base station, measurement results, the measurement results comprising at least one relay node related measurement result and total physical resource block usage measurement result taking into account both the user equipment and the at least one relay node,
    wherein, with the measurements, the at least one relay node related measurement result is formed separately from the total physical resource block usage measurement result, and
    wherein the at least one relay node related measurement result comprises information related only to the physical resource block usage of the at least one relay node, and the total physical resource block usage measurement result is an aggregate for all user equipments and relay nodes in a cell; and
    providing the at least one relay node related measurement result and/or the total physical resource block usage measurement result for operation, administration, and maintenance (OAM) performance observability.

2. The method as claimed in claim 1, wherein the air interface related measurements include layer 2 measurements and the at least one merely relay node related measurement result is at least one of the following: the packet delay in one or more backhaul links provided in the air interface, data loss in the one or more backhaul links, and scheduled IP throughput in the one or more backhaul links.

3. The method as claimed in claim 1, wherein the air interface related measurements include layer 2 measurements and the at least one merely relay node related measurement result comprises usage of at least one relay node related physical resource block.

4. The method as claimed in claim 3, wherein usage of the at least one relay node related physical resource block is provided subframe configuration specifically.

5. The method as claimed in claim 4, wherein the usage indicates one of the following: an aggregate value, a maximum value, and a minimum value.

6. The method as claimed in claim 3, wherein the at least one relay node related physical resource block is for an inband relay node an aggregate for user equipments in a cell and relay nodes in the cell that are permitted to use the corresponding subframe configuration and for an outband relay node for relay nodes in the cell that are permitted to use the corresponding subframe configuration.

7. The method as claimed in claim 3, wherein usage of the at least one relay node related physical resource block is provided as an average of different subframe configuration specifically provided physical resource block usages.

8. The method as claimed in claim 3, wherein the measurement result further comprises information on a subframe configuration comprising the physical resource block.

9. The method as claimed in claim 1, wherein the measurement result comprises signal strengths of two or more different base stations recorded in the at least one relay node.

10. The method as claimed in claim 9, wherein a signal strength associated with a base station is a maximum signal strength amongst signal strengths recorded for the base station with different directional antenna adjustments.

11. A non-transitory computer readable medium storing computer program code configured to perform the method as claimed in claim 1.

12. An apparatus comprising:
    at least one memory comprising computer program code; and
    at least one processor,
    wherein the at least one memory and the computer program code are configured, with the at least one processor, to cause the apparatus at least to:
    obtain air interface related measurements, at a base station, wherein the air interface related measurements comprise physical resource block usage measurements to measure both a user equipment directly connected to the base station and at least one relay node related physical resource block usage;
    form, at the base station, from the measurements comprising data of both the user equipment directly connected to the base station and the at least one relay node measurement results, the measurement results comprising at least one relay node related measurement result and total physical resource block usage measurement result taking into account both the user equipment and the at least one relay node,
    wherein, with the measurements, the at least one relay node related measurement result is formed separately from the total physical resource block usage measurement result, and
    wherein the at least one relay node related measurement result comprises information related only to the physical resource block usage of the at least one relay node, and the total physical resource block usage measurement result is an aggregate for all user equipments and relay nodes in a cell; and
    provide the at least one relay node related measurement result and/or the total physical resource block usage measurement result for operation, administration, and maintenance (OAM) performance observability.

13. A system comprising:
    at least one relay node; and
    a base station according to claim 12, the base station serving the at least one relay node; and
    an operations, administrations and maintenance system.

* * * * *